United States Patent
Kobayashi

(10) Patent No.: US 8,708,256 B2
(45) Date of Patent: Apr. 29, 2014

(54) FUEL INJECTION VALVE

(75) Inventor: Tatsuo Kobayashi, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 277 days.

(21) Appl. No.: 13/141,942

(22) PCT Filed: Apr. 8, 2010

(86) PCT No.: PCT/JP2010/056372
§ 371 (c)(1),
(2), (4) Date: Jun. 23, 2011

(87) PCT Pub. No.: WO2011/125201
PCT Pub. Date: Oct. 13, 2011

(65) Prior Publication Data
US 2012/0056018 A1   Mar. 8, 2012

(51) Int. Cl.
*F02M 61/00* (2006.01)
*B05B 1/30* (2006.01)
*F02M 51/00* (2006.01)

(52) U.S. Cl.
USPC ............. 239/585.5; 239/533.12; 239/487; 239/488

(58) Field of Classification Search
USPC ............ 239/533.1, 533.2–533.15, 569, 584, 239/585.1, 585.2, 585.4, 585.5, 461, 463, 239/464, 468, 469, 470, 486, 487, 488, 489
See application file for complete search history.

(56) References Cited

U.S. PATENT DOCUMENTS

| | | | | |
|---|---|---|---|---|
| 1,252,254 A | * | 1/1918 | Fisher | 123/294 |
| 1,657,395 A | * | 1/1928 | Held | 123/305 |
| 2,974,881 A | * | 3/1961 | Garday | 239/533.12 |
| 4,060,199 A | * | 11/1977 | Brune et al. | 239/488 |

(Continued)

FOREIGN PATENT DOCUMENTS

| | | |
|---|---|---|
| DE | 102 14 096 A1 | 10/2002 |
| JP | 61-129461 A | 6/1986 |

(Continued)

OTHER PUBLICATIONS

Extended Search Report issued in corresponding European Patent Application No. 10849444.4 dated Aug. 23, 2013.

(Continued)

*Primary Examiner* — Justin Jonaitis
(74) *Attorney, Agent, or Firm* — Sughrue Mion, PLLC

(57) ABSTRACT

A fuel injection valve 30 includes: a nozzle body 31 provided with a jet hole 32 at an end portion thereof; and a needle 33 slidably arranged within the nozzle body 31, defining a fuel introduction path 34 between the needle 33 and the nozzle body 31, and provided with a seat portion 33a seated on a seated position 31a within the nozzle body 31. The fuel injection valve 30 includes: a rotational flow generation portion 36 formed in an upstream side of the seat portion 33a of the needle 33, and provided with a spiral groove 36a giving a rotational component to a fuel introduced from the fuel introduction path 34; an air introduction path 37 formed inside the needle; and a rotation stable chamber 45 formed at the end portion of the nozzle body 31, the fuel that has passed through the rotational flow generation portion 36 and the air that has passed through the air introduction path 37 being introduced into the rotational stable chamber 45.

7 Claims, 7 Drawing Sheets

(56) References Cited

U.S. PATENT DOCUMENTS

| | | |
|---|---|---|
| 5,148,788 A | 9/1992 | Saikalis et al. |
| 6,209,806 B1 * | 4/2001 | Pace et al. .................. 239/585.5 |
| 2006/0131447 A1 | 6/2006 | Masuda et al. |

FOREIGN PATENT DOCUMENTS

| JP | 61-145356 A | 7/1986 |
|---|---|---|
| JP | H05-56263 U | 7/1993 |
| JP | 6-317231 A | 11/1994 |
| JP | H08-500164 A | 1/1996 |
| JP | 9-88610 A | 3/1997 |
| JP | 10-176631 | 3/1998 |
| JP | 10-141183 A | 5/1998 |
| JP | H11-200994 A | 7/1999 |
| JP | 2000-009002 A | 1/2000 |
| JP | 2000-154768 A | 6/2000 |
| JP | 2001-182641 A | 7/2001 |
| JP | 2002-357169 A | 12/2002 |
| JP | 2003-120472 A | 4/2003 |
| JP | 2003-148302 A | 5/2003 |
| JP | 2005-315136 A | 11/2005 |
| JP | 2006-116365 A | 5/2006 |
| JP | 2006-177174 A | 7/2006 |
| JP | 2008-25485 A | 2/2008 |
| JP | 2008-138609 A | 6/2008 |
| JP | 2008-237995 A | 10/2008 |
| JP | 2009-11932 A | 1/2009 |
| JP | 2010-112196 A | 5/2010 |

OTHER PUBLICATIONS

Extended European Search Report issued on Dec. 11, 2013 in European patent application No. 10854099.8.

* cited by examiner

FUEL INJECTION VALVE

CROSS REFERENCE TO RELATED APPLICATIONS

This application is a National Stage of International Application No. PCT/JP2010/056372 filed Apr. 8, 2010, the contents of all of which are incorporated herein by reference in their entirety.

TECHNICAL FIELD

The present invention relates to a fuel injection valve.

BACKGROUND ART

Conventionally, there has been proposed to promote mixture of air and fuel in a combustion chamber. For example, there is a proposal for a fuel injection nozzle in which a spiral path is formed between a wall surface of a hollow bore of a nozzle body and a sliding surface of a needle (for example, Patent Document 1). In this proposal, the rotational flow of the fuel passed through the spiral path is accelerated in a fuel retaining portion provided at an end of the nozzle body. The fuel has a velocity in the tangent direction of a single jet hole, and spreads into the combustion chamber to mix the fuel and air.

Patent Document 1: Japanese Patent Application Publication No. 10-141183

DISCLOSURE OF THE INVENTION

Problems to be Solved by the Invention

Incidentally, there is known that the reduction in the particle diameter of the injection fuel is effective for the improvement of the mileage and the exhaust emission of the internal combustion engine. In Patent Document 1, the mixture of fuel and air can be promoted. However, there is room for improvement in the reduction in the particle diameter of the injection fuel.

Thus, the present invention has an object to promote the reduction in the atomized particle diameter.

Means for Solving the Problems

In order to solve the above problem, a fuel injection valve, described herein, characterized by includes: a nozzle body provided with a jet hole at an end portion of the nozzle body; a needle slidably arranged within the nozzle body, defining a fuel introduction path between the needle and the nozzle body, and provided with a seat portion seated on a seated position within the nozzle body; a rotational flow generation portion formed in an upstream side of the seat portion of the needle, and provided with a spiral groove giving a rotational component to a fuel introduced from the fuel introduction path; an air introduction path formed inside the needle; and a rotation stable chamber formed at the end portion of the nozzle body, the fuel that has passed through the rotational flow generation portion and the air that has passed through the air introduction path being introduced into the rotational stable chamber.

The fuel introduced into the spiral groove from the fuel introduction path makes a rotational flow in the rotation stable chamber. The pressure is reduced in the vicinity of the center of the rotational flow caused by the fuel. Air is introduced through the air introduction path into the region where the pressure is lowered. The introduced air generates minute air bubbles in fuel. Since the air is introduced to the region where the pressure is lowered, the air can be easily introduced into the rotation stable chamber to which high pressure fuel is supplied.

In the rotation stable chamber, the rotational velocity of fuel is faster around the center and becomes slower as closer to a wall surface. Further, in the rotation stable chamber, the internal pressure is low around the center and becomes higher as closer to the wall surface. Under such an environment, the minute air bubbles concentrically exist on the wall surface side as each particle diameter becomes smaller. Such a way, the jet holes are provided near the region where the minute air bubbles with small diameters concentrically existing, so that the minute air bubbles can be injected. After the injection, the injected minute air bubbles explode to be atomized fuel.

Additionally, the rotational flow generation portion provided with the spiral groove can be made a needle eccentricity suppression guide.

A spiral pitch of the spiral groove can be narrower as closer to the seat portion. The spiral pitch is gradually narrowed, thereby increasing the rotational component of the fuel flow. The increase in the rotational component of the fuel flow can exert the rotational effect on the fuel, even when the needle is in a low lift state and the amount of fuel flowing into the rotation stable chamber is low.

An opening of the air introduction path can face a central portion of the rotation stable chamber. This is because the rotation of fuel permits air to be effectively introduced to the low-pressure region. Specifically, it is desirable that an axis of the air introduction path should be identical to an central axis of the rotation stable chamber and a diameter of the opening of the air introduction path should be equal to or less than one thirds of a diameter of the rotation stable chamber.

As described above, the minute air bubbles concentrate on the wall surface side as each diameter is smaller. For this reason, it is desirable that the jet hole should be provided at a position offset from the central axis of the rotation stable chamber. More specifically, it is desirable that the jet hole should be offset from an central axis of the rotation stable chamber by equal to or more than a quarter of the diameter of the rotation stable chamber. The jet hole is provided to be offset, thereby injecting the minute air bubbles with small diameters concentrically existing on the wall surface side.

The air introduction path can be provided with a check valve opening the air introduction path when the rotation stable chamber is in an negative pressure state. It is therefore possible to prevent the fuel in the rotation stable chamber or the combustion gas in the combustion chamber from leaking through the air introduction path to the outside.

Effects of the Invention

According to the fuel injection valve described herein, it is possible to mix injection fuel with minute air bubbles and to promote the reduction in the atomized particle diameter.

BEST MODES FOR CARRYING OUT THE INVENTION

Figure 1:
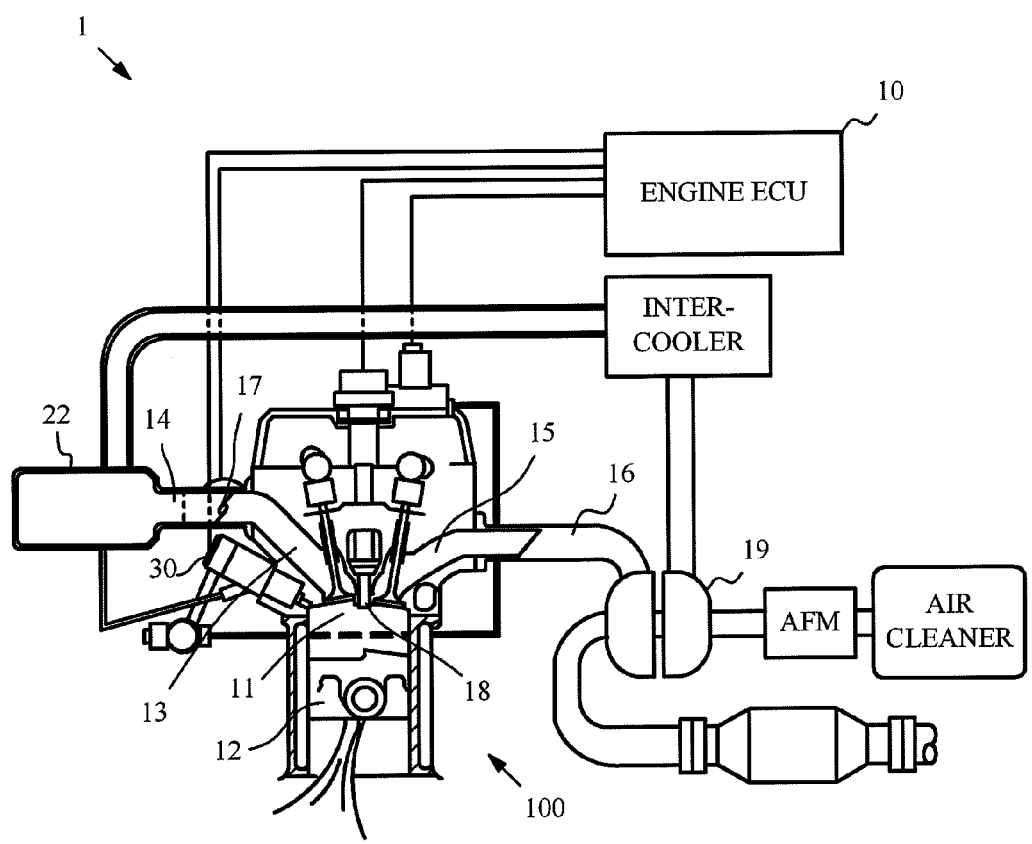
FIG. 1 is a view of an example of an engine system according to an embodiment.

The embodiment according to the present invention will be described below with reference to the accompanying drawings. Herein, a ratio and a dimension of each component illustrated in the drawings may not correspond to the actual ones. Also, some details may be omitted in the drawings.

Embodiment

An embodiment according to the present invention will be described with reference to the accompanying drawings. FIG. 1 is a view of an example of an engine system 1 equipped with a fuel injection valve 30 according to the present invention. Additionally, the engine 100 is partially illustrated in FIG. 1.

The engine system 1 illustrated in FIG. 1 is equipped with an engine 100 which is a power source and an engine Electronic Control Unit (ECU) which wholly controls the driving operation of the engine 100. The engine system 1 is equipped with the fuel injection valve 30 injecting the fuel into a combustion chamber 11 of the engine 100. An engine ECU 10 has the function of a control unit. The ECU 10 is a computer which includes: a Central Processing Unit (CPU) processing calculation; a Read Only Memory (ROM) storing programs or the like; and a Random Access Memory (RAM) and a Non-Volatile RAM (NVRAM) storing data.

The engine 100 is mounted on a vehicle and is equipped with a piston 12 defining the combustion chamber 11. The piston 12 is slidably fitted into a cylinder of the engine 100. Further, the piston 12 is coupled through a connecting rod to a crankshaft which is an output shaft member.

The air which flows from an intake port 13 into the combustion chamber 11 is compressed in the combustion chamber 11 by the upward movement of the piston 12. The engine ECU 10 decides the fuel injection timing and transmits signals to the fuel injection valve 30, on the basis of the position of the piston 12 transmitted from a crank angle sensor and the information of the camshaft rotational phase transmitted from and an intake cam angle sensor. The fuel injection valve 30 injects fuel at the specified timing in response to signals from the engine ECU 10. The fuel injected by the fuel injection valve 30 is atomized to be mixed with the compressed intake air. The fuel mixed with the intake air is ignited by a spark plug 18 to be burned. Therefore, the combustion chamber 11 is expanded to move the piston 12 downwardly. This downward movement is changed to the rotation of the crankshaft through the connecting rod, whereby the engine 100 obtains power.

The combustion chamber 11 is connected to the intake port 13 and an intake path 14, which is connected to the intake port 13 to introduce intake air therefrom to the combustion chamber 11. Further, the combustion chamber 11 is connected to an exhaust port 15 and an exhaust path 16 to introduce exhaust gas generated in the combustion chamber 11 to the outside of the engine 100. A surge tank 22 is arranged at the intake path 14.

An airflow meter, a throttle valve 17 and a throttle position sensor are installed in the intake path 14. The airflow meter and the throttle position sensor respectively detect an intake air quantity passing through the intake path 14 and an opening degree of the throttle valve 17 to transmit the detection results to the engine ECU 10. The engine ECU 10 recognizes the intake air quantity introduced to the intake port 13 and the combustion chamber 11 on the basis of the transmitted detection results, and adjusts the opening degree of the throttle valve 17 to adjust the intake air quantity.

It is preferable that the throttle valve 17 should be applicable to a throttle-by-wire type employing a stepper motor. However, the throttle valve 17 may be applicable to, for example, a mechanical throttle mechanism which is interlocked to an accelerator pedal (not illustrated) through wires instead of the step motor and which changes the opening degree of the throttle valve 17.

A turbocharger 19 is arranged at the exhaust path 16. The turbocharger 19 uses the kinetic energy of exhaust gas passing through the exhaust path 16, thereby allowing a turbine to rotate. Therefore, the air that has passed through an air cleaner is compressed to flow into an intercooler. After the compressed intake air is cooled in the intercooler to be retained in the surge tank 22, it is introduced into the intake path 14. In this case, the engine 100 is not limited to a supercharged engine provided with the turbocharger 19, and may be a normally aspirated (Natural Aspiration) engine.

The piston 12 is provided with a cavity at the top surface thereof. As for the cavity, the wall surface is formed by a curved surface which is gently continued from the fuel injection valve 30 to the spark plug 18, and the fuel injected from the fuel injection valve 30 is introduced to the vicinity of the spark plug 18 along the shape of the wall surface. In this case, the cavity of the piston 12 can be formed in an arbitrary shape at an arbitrary position in response to the specification of the engine 100. For example, a re-entrant type combustion chamber may be provided in such a manner that a circular cavity is formed at the central portion of the top surface of the piston 12

The fuel injection valve 30 is obliquely arranged in the combustion chamber 11 under the intake port 13. On the basis of the instructions of the ECU 10, the fuel injection valve 30 directly injects the high-pressured fuel supplied from a fuel pump via a fuel path into the combustion chamber 11 through jet holes 32, which are provided at a front end portion of a nozzle body 31 at equal intervals in the circumferential direction thereof. The injected fuel is atomized and mixed with intake air in the combustion chamber 11 to be introduced into the vicinity of the spark plug 18 along the shape of the cavity. The leak fuel of the fuel injection valve 30 is returned from a relief valve to a fuel tank through a relief pipe.

In this case, the fuel injection valve 30 is not limited to be arranged under the intake port 13. The fuel injection valve 30 may be arranged at an arbitrary position in the combustion chamber 11. Further, the fuel injection valve 30 is not limited to be arranged in the combustion chamber 11. The fuel injection valve 30 may be arranged in the intake port 13, and two valves may be arranged in the combustion chamber 11 and the intake port 13 respectively.

Additionally, the engine 100 is not limited to a gasoline engine. The engine 100 may be any one of a diesel engine using a diesel oil as fuel and a flexible fuel engine using the fuel containing gasoline and diesel oil at an arbitrary ratio. Also, the engine system 1 may be a hybrid system which combines the engine 100 and plural electric motors.

Figure 2A:
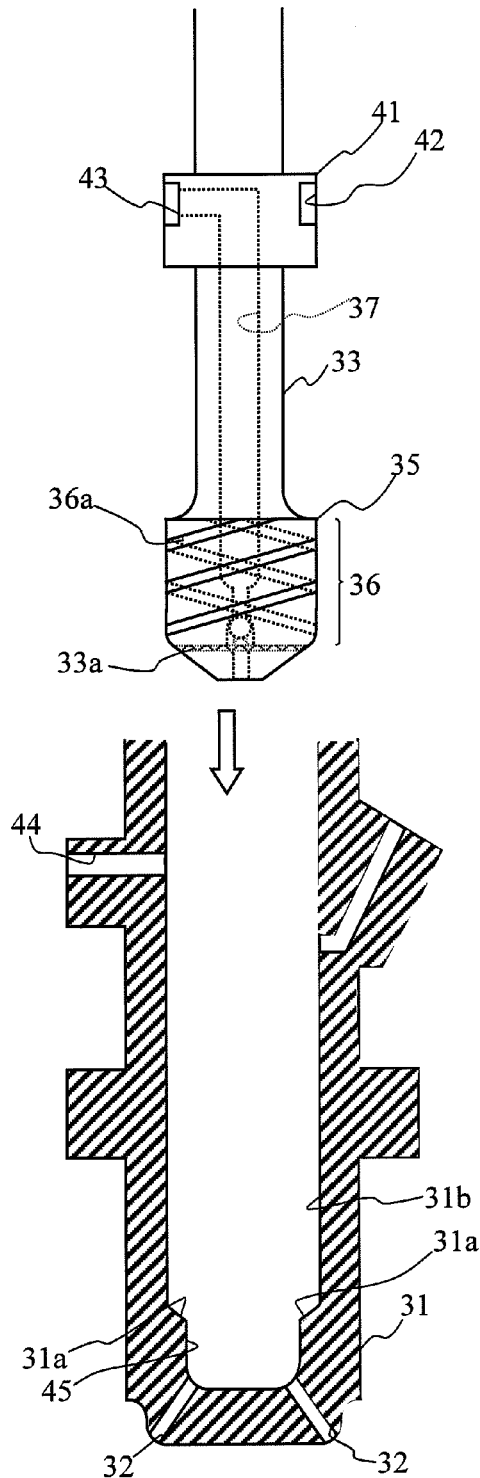
FIG. 2A is an explanatory view of a state where a nozzle body and a needle of a fuel injection valve according to the embodiment are detached from each other.
Figure 2B:
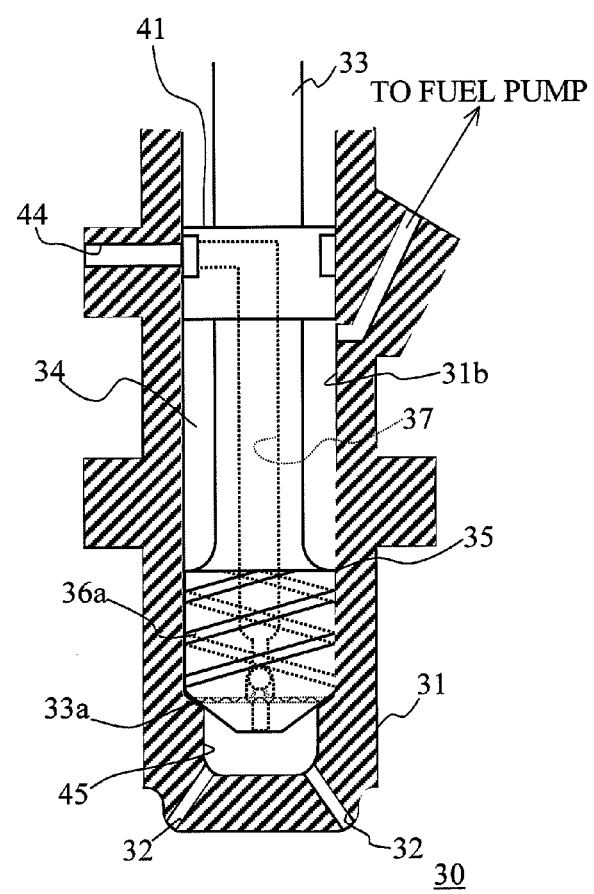
FIG. 2B is an explanatory view of a state where the nozzle body and the needle of the fuel injection valve according to the embodiment are attached to each other.

Next, an inner structure of the fuel injection valve 30 in the embodiment according to the invention will be described in detail. FIG. 2A is an explanatory view of a state where the nozzle body 31 and a needle 33 of the fuel injection valve 30 according to the embodiment are detached from each other. FIG. 2B is an explanatory view of a state where the nozzle body 31 and the needle 33 of the fuel injection valve 30 according to the embodiment are attached to each other. Additionally, FIGS. 2A and 2B illustrate only the structure of the front end portion of the fuel injection valve 30.

The fuel injection valve 30 is equipped with the nozzle body 31 having the jet holes 32 at its front end portion. The entrance of the jet hole 32 opens in the corner portion where the bottom surface and the side surface of a rotation stable chamber 45 described later are intersected with each other. A seat position 31a is provided at the inner side of the nozzle body 31. Also, the fuel injection valve 30 is equipped with the needle 33 slidably arranged within this nozzle body 31. A fuel introduction path 34 is defined between the needle 33 and the nozzle body 31 as illustrated in FIG. 2B. The needle 33 is provided at the front end side with a first eccentricity suppression portion 35, and at the front end thereof with a seat portion 33a seating on the seat position 31a of the nozzle body 31. The first eccentricity suppression portion 35 is fitted into the nozzle body 31 with a slight clearance between the inner peripheral wall thereof and the first eccentricity suppression portion 35, thereby suppressing the eccentricity of the needle 33. The needle 33 is driven by a piezo actuator.

The needle 33 is provided with a rotational flow generation portion 36 at the first eccentricity suppression portion 35. The rotational flow generation portion 36 is formed on the upstream side of the seat portion 33a. The rotational flow generation portion 36 is provided with a spiral groove 36a which gives rotational components to the fuel introduced from the fuel introduction path 34. It is only necessary to provide one line of the rotational flow generation portion 36. In the present embodiment, two lines of the rotational flow generation portion 36 are provided.

Figure 3:
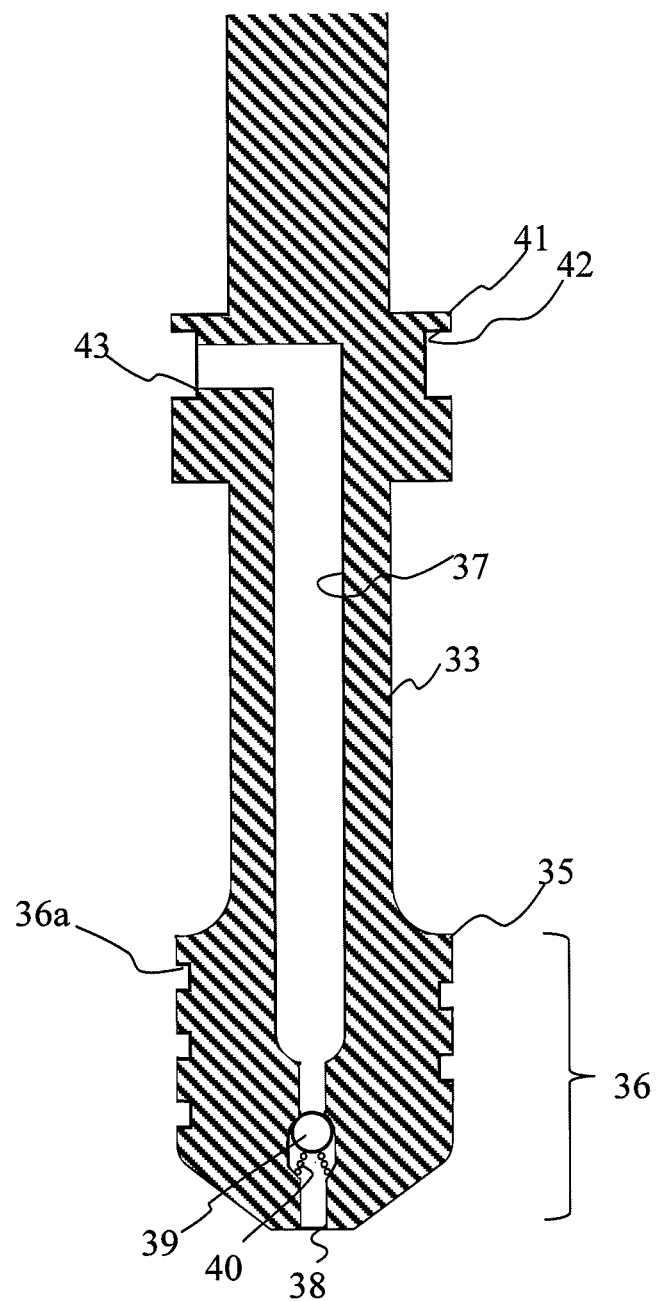
FIG. 3 is a sectional view of the needle provided in the fuel injection valve according to the embodiment.

An air introduction path 37 is formed inside the needle 33, as illustrated in FIG. 3. An opening 38 on the outlet side of the air introduction path 37 is located at the front end portion of the needle 33. Like fuel, the air introduction path 37 introduces air from the rear end side of the fuel injection valve 30 to the front end side thereof. In the vicinity of the opening 38 of the air introduction path 37, a check valve 39 with a spherical shape is provided to be biased by a spring 40. The check valve 39 opens, when the rotation stable chamber 45 is in a negative-pressure state, as will be described.

A second eccentricity suppression portion 41 is provided at the rear end side of the first eccentricity suppression portion 35 of the needle 33. A groove 42 is provided at an outer peripheral wall of the second eccentricity suppression portion 41 to be formed in the circumferential shape. The opening 43 of the inlet side of the air introduction path 37 is exposed in the groove 42. An air introduction hole 44 is provided in the nozzle body 31. This air introduction hole 44 is connected to the surge tank 22 as illustrated in FIG. 1. When the air introduction hole 44 faces the groove 42, the air introduction path 37 is communicated to the surge tank 22. Additionally, the air introduction hole 44 has only to introduce air into the air introduction path 37. The connection point of the air introduction hole 44 is not limited to the surge tank 22.

The nozzle body 31 is provided with the rotation stable chamber 45 at its front end portion as illustrated in FIGS. 2A and 2B. The fuel passing through the rotational flow generation portion 36 and the air passing through the air introduction path 37 are introduced to the rotation stable chamber 45. In the rotation stable chamber 45, the rotational velocity of the fuel generated by the rotational flow generation portion 36 is enhanced to be in a stable state along the inner peripheral wall of the rotation stable chamber 45. When the rotational flow is stable, a negative-pressure portion is generated at the central portion of the rotation stable chamber 45. The opening 38 of the air introduction path 37 is made to face the central portion of the rotation stable chamber 45 to be exposed to this negative-pressure portion. This introduces air to the negative-pressure portion. Since a pressure in the negative-pressure portion is low, air can be introduced with ease. Also, the opening 38 of the air introduction path 37 is exposed to the negative-pressure portion to introduce air, thereby suppressing the turbulence of the rotational flow.

The fuel introduced into the rotation stable chamber 45 takes air thereinto, so that minute air bubbles are generated. The minute air bubbles are injected from the jet holes 32. After the injection, the film of the fuel forming the injected minute air bubble is collapsed, whereby the fuel is in a finely atomized state. When the fuel becomes in a super minute state, it is possible to reduce the ignition delay time, increase the combustion speed, suppress the oil dilution caused by fuel, suppress the deposit, and suppress the knocking, in a well balanced manner.

Dimensions of portions and arrangements of elements will be described with reference to FIGS. 4 to 6. First, a diameter De of the rotation stable chamber 45 will be explained. The diameter De of the rotation stable chamber 45 satisfies the following formula 1.

$$De \leq Q \times \cos\theta \times Rs^2 \times Rd/(2200 \times \pi \times Sg)$$  Formula 1

De: rotation stable chamber diameter
Q: a greatest fuel flow rate
θ: a spiral groove angle (but it is an angle with respect to the horizon at a terminal end of the spiral groove)
Rs: a spiral groove area ratio (a spiral groove area Sg/(a clearance CL+the spiral groove area Sg))
Rd: a rotation diameter ratio (a fuel introduction path diameter Di/a rotation stable chamber diameter De)
Sg: the spiral groove area
Additionally, the value of 2200 indicates that rotational frequency is 2200 Hz.
The clearance CL is an area defined between the outer circumferential wall surface of the first eccentricity suppression portion 35 and the inner circumferential wall surface of the nozzle body 31. The total of the clearance CL and the spiral groove area Sg is a flow path area through which the fuel can flows from the fuel introduction path 34 into the rotation stable chamber 45.

The reason why it is desirable that the diameter De of the rotation stable chamber 45 satisfies the formula 1 is as follows: The minute air bubbles have to be pressure-collapsed for a desired period after injected from the jet holes 32. The period while the minute air bubbles of the fuel are being pressure-collapsed depends the diameter of the air bubble. Also, the diameter of the air bubble of the fuel is influenced by the rotational frequency, that is, the number of rotations per unit period. FIG. 5 is an explanatory view of relationships between rotational frequencies, air bubble diameters, and pressure-collapse periods. In order to pressure-collapse the injected fuel in the combustion chamber, it is desirable that the pressure-collapse period should be set to be equal to or less than 10 ms. In order for the pressure-collapse period to be 10 ms, the diameter of the air bubble is set to 4.8 μm. In order for the diameter of the air bubble is set to 4.8 μm, the rotational frequency is set to be equal to or more than 2200 Hz. The rotational frequency is set to 2200 Hz in formula 1. As for the diameter De of the rotation stable chamber 45, formula 1 is satisfied, whereby the diameter of the air bubble is equal to or less than 4.8 μm and the pressure-collapse period is equal to or less than 10 ms. As described above, the relationship of formula 1 is defined.

Next, a description will be given of the spiral groove area ratio Rs indicating the relationship between the area Sg of the spiral groove 36*a* and the clearance CL. As mentioned above, the spiral groove area ratio Rs is represented by Rs=Sg/(CL+ Sg), wherein 0.72≤Rs≤0.94.

The area Sg of the spiral groove 36*a* generating the rotational flow has a lower limit caused by the necessity to secure a width B of the seat portion 33*a*. Also, the area Sg has an upper limit caused by the necessity to secure the smooth sliding of the first eccentricity suppression portion 35. When a minimum of the width B of the seat portion 33*a* is set to 0.2 mm and a minimum clearance CL for securing the smooth sliding of the first eccentricity suppression portion 35 is set to 4 μm, Rs has to be set to 0.72≤Rs≤0.94. This can ensure a sufficient rotational flow rate. Thus, this can ensure a desired diameter of the air bubble and a desired pressure-collapse period. As a result, the fuel immediately can be atomized and the fuel droplet can be suppressed from being hit to the wall surface of the combustion chamber. The fuel droplet can be suppressed from being hit to the wall surface of the combustion chamber, thereby suppressing the dilution of the oil caused by the fuel.

Next, the opening 38 of the air introduction path 37 will be explained. An axis of the air introduction path 37 is identical to a central axis AX of the rotation stable chamber 45 and the nozzle body 31 as illustrated in FIG. 4. The diameter Ds of the opening 38 is set to be equal to or less than one thirds the diameter De of the rotation stable chamber 45. The fuel is rotated within the rotation stable chamber 45, whereby the rotational flow velocity is great at the central portion of the rotation stable chamber 45. The pressure is low at the central portion of the rotation stable chamber 45. FIG. 6 is an explanatory view of an example of the rotational flow velocity and the pressure distribution in the rotation stable chamber 45. The pressure is low at a region De/3 of the central portion in the rotation stable chamber 45. The rotational flow velocity is higher as closer to the center from the inner peripheral surface of the rotation stable chamber 45. Just after air is introduced into the rotation stable chamber 45, the diameters of air bubbles are not uniform. However, the air bubble with a large diameter is greatly influenced by the pressure gradient, and the air bubble with a small diameter is greatly influenced by the flow velocity. Thus, the minute air bubble with a small diameter moves to the inner peripheral wall side of the rotation stable chamber 45. The large air bubble with a large diameter is flowed to the central portion where the pressure is low. The air bubble flowed to the central portion is collapsed by the turbulence of the high flow velocity. As a result, large air bubbles also can be transformed into minute air bubbles.

Supposedly, if the diameter Ds of the opening 38 is larger than De/3, the opening 38 faces the region where the pressure is high. The opening 38 faces the region where the pressure is high, so that it is difficult to supply air adequately. As a result, it may be difficult to secure air bubbles adequately, so that the atomization of fuel may be not promoted. Thus, the position and the diameter Ds of the opening 38 are set so as to precisely introduce air to the region ranging from the center to De/3. Air is introduced to the rotation stable chamber 45, thereby facilitating the generation of air bubbles. Additionally, it is conceivable that the opening 38 faces the high-pressure region so that fuel flows backward to the air introduction path 37. However, the backward flow of fuel can be avoided by the provision of the check valve 39.

Next, the arrangements of the jet holes 32 will be described. The jet holes 32 are arranged to be offset from the central axis AX of the rotation stable chamber 45. More specifically, the jet hole 32 is offset from the central axis AX of the rotation stable chamber 45 be equal to or more than a quarter of the diameter De of the rotation stable chamber 45, as illustrated in FIG. 4. As illustrated in FIG. 6, the pressure is low in the central portion of the rotation stable chamber 45, and the pressure is higher as closer to the inner peripheral wall. Also, the rotational velocity in the rotation stable chamber 45 is greater as closer to the central portion from the inner peripheral surface of the rotation stable chamber 45. In the rotation stable chamber 45 where the pressure and the rotational velocity are distributed in such a manner, the air bubbles with small diameters are readily concentrated in the vicinity of the inner peripheral wall, as mentioned above. Thus, the jet holes 32 is offset from the central axis AX, thereby injecting the fuel mixed with the minute air bubbles generated in the vicinity of the rotational center without the large air bubbles concentrated in the rotational center. Further, the fuel is injected from the offset jet holes 32. It is thus possible to stop the rotational flow and ensure the generation of air bubbles and the atomization of fuel.

Figure 6:
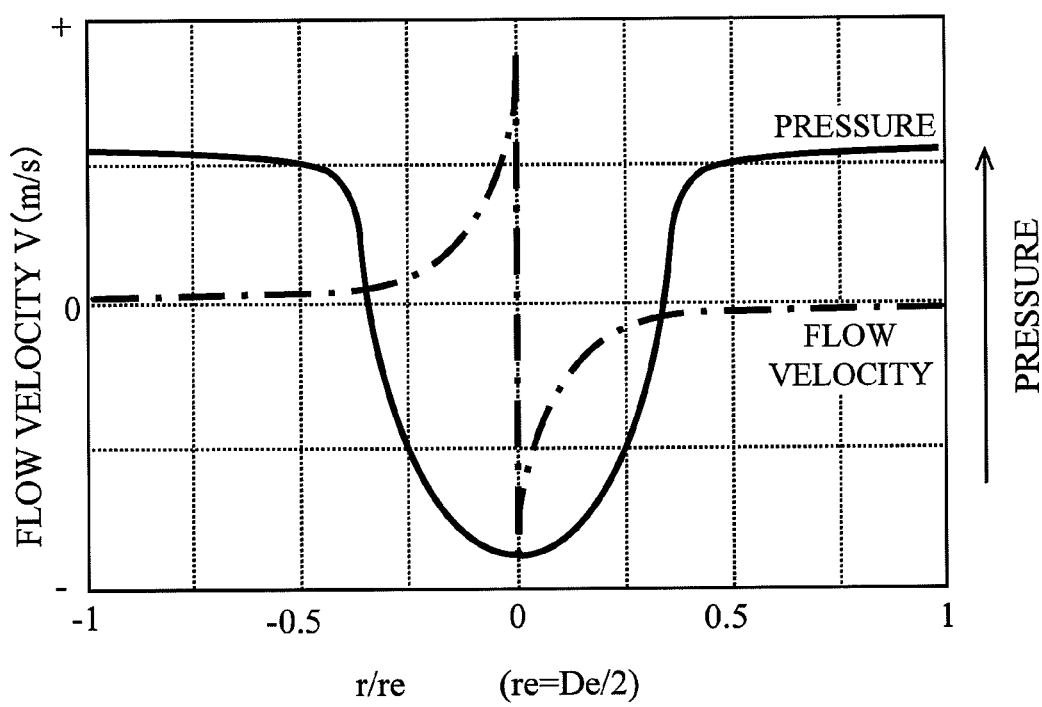
FIG. 6 is an explanatory view of an example of rotational flow velocities and a pressure distribution in a rotation stable chamber.

Referring to FIG. 6, it is desirable that the jet holes 32 should be arranged at a position other than at least De/3 of the central region. Further, it is desirable that the jet holes 32 should be offset from the central axis AX of the rotation stable chamber 45 to at least equal to or more than a quarter of the diameter De of the rotation stable chamber 45. Thus, the offset amount is set to be from the central axis AX to equal to or more than a quarter of the diameter De, so that the jet holes 32 are arranged at the position where the rotational velocity is low and stable. It is thus possible to stably maintain the difference in pressure between the front and rear of the jet hole 32. This can certainly ensure the effects of the injection of fuel including miniaturized air bubbles and the stop of the rotational flow. In addition, gas can be prevented from reversely flowing from the combustion chamber, and a variation in the amount of injecting fuel can be suppressed. A variation in the amount of injecting fuel is suppressed, thereby suppressing a variation between cycles.

The description heretofore has been given of the detailed dimensions and the arrangements of each portion of the fuel injection valve 30. In the above fuel injection valve 30, the needle 33 is opened or closed by the piezo actuator. The piezo actuator opens or closes the needle 33 with a rectangular shape. The diameter of air bubble and the pressure-collapse period in the fuel injection valve 30 are influenced by the fuel flow rate. For this reason, the instantaneous flow rate of fuel determining the rotational flow side is important. The opening speed of the needle 33 is increased by using the piezo actuator with superior responsiveness. It is thus possible to suppress an increase in the diameter of air bubble just after the opening of the needle 33 and just before the closing thereof. This can suppress the degradation of atomization of fuel. Even under the driving conditions under which the injection period is short and the amount of the injection is small, the piezo actuator allows the minute air bubbles to be generated without decreasing the instantaneous flow rate. This can achieve the atomization of fuel in a stable manner.

Additionally, the clearance between the inner peripheral wall 31*b* of the nozzle body 31 and the outer peripheral wall of the first eccentricity suppression portion 35 illustrated in FIGS. 2A and 2B is set to be constant in all lift areas of the needle 33. It is thus possible to increase the rotational velocity at the injection middle time where the flow rate is large (in a high lift state), as compared with at the injection initial time in a small lift state. An increase in the rotational velocity can reduce the diameter of air bubble, thereby shorting the pressure-collapse period.

Figure 4:
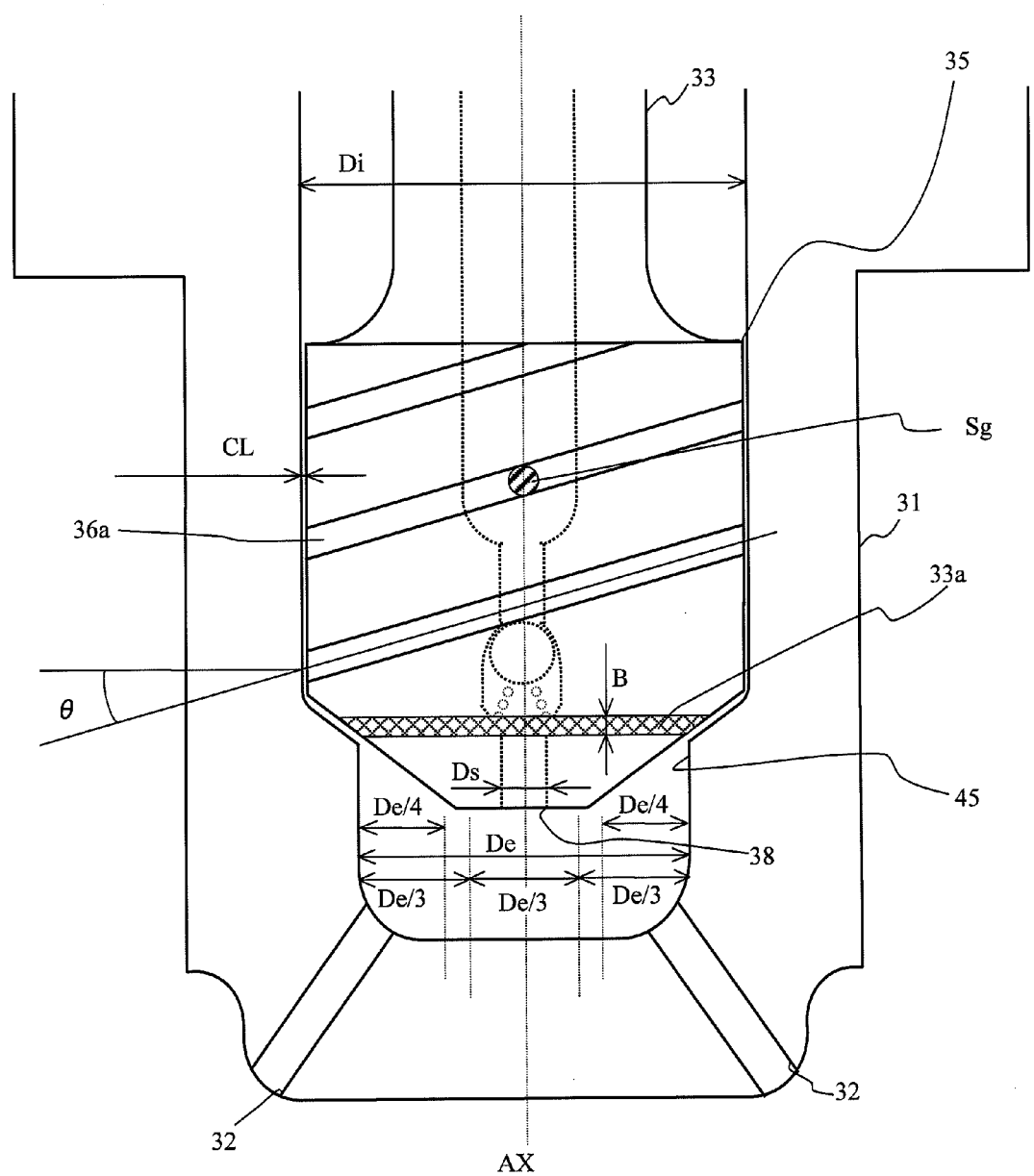
FIG. 4 is an explanatory view of a dimension of each portion of the fuel injection valve.
Figure 5:
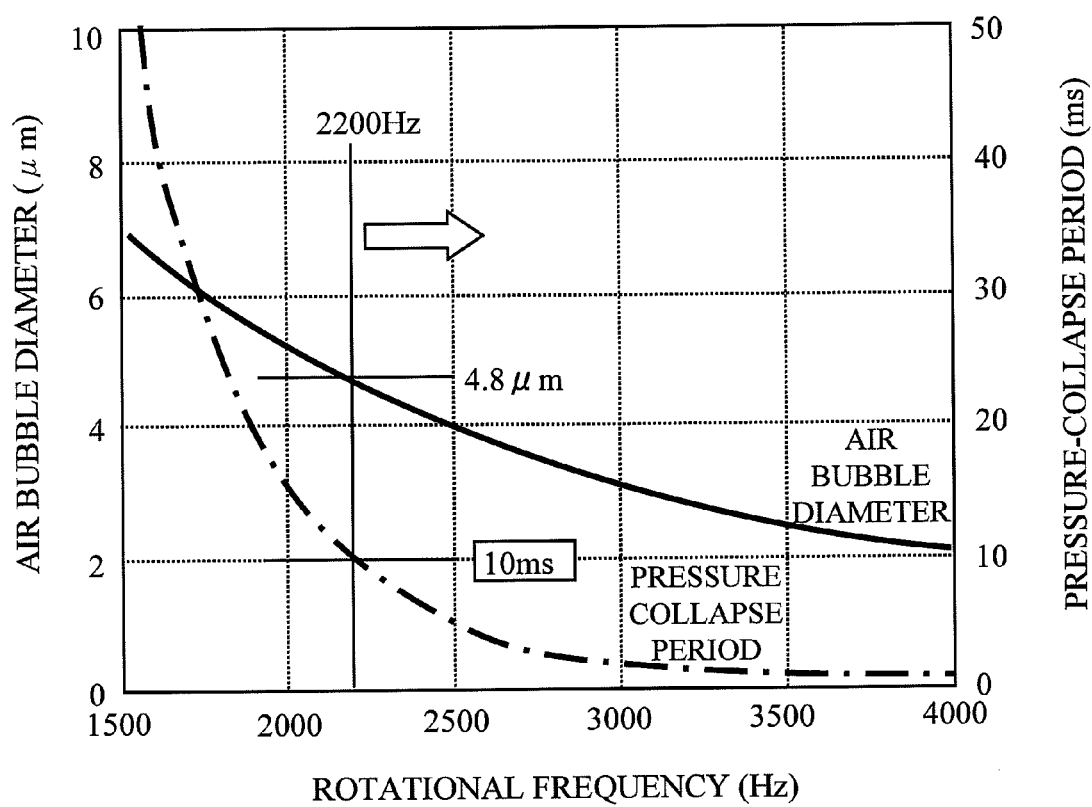
FIG. 5 is an explanatory view of relationships between rotational frequencies, air bubble diameters, and pressure-collapse period.
Figure 7:
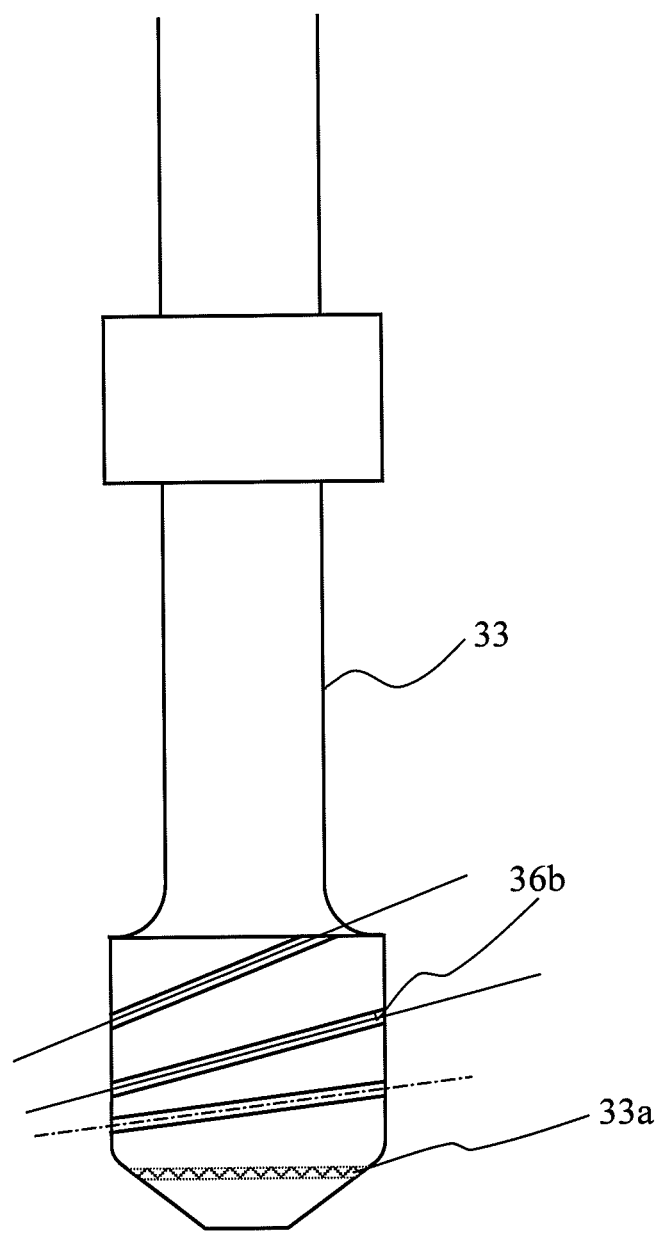
FIG. 7 is an explanatory view of a needle according to another embodiment.

The spiral pitch of the spiral groove 36a provided in the needle 33 illustrated in FIGS. 2 to 4 is uniform in the range from the inlet side end portion to the outlet side end portion. However, the spiral pitch may be narrower as closer to the seat portion 33a as illustrated in FIG. 7. Such a spiral pitch can change a direction of a velocity vector of fuel to the rotational direction as closer to the front end portion. It is thus possible to increase the rotational velocity, even if the amount of fuel is small.

By the atomization of fuel caused by the fuel injection valve 30 described above, it is possible to reduce the ignition delay time, increase the combustion speed, suppress the oil dilution caused by fuel, suppress the deposit, and suppress the knocking, in a well balanced manner.

While the exemplary embodiments of the present invention have been illustrated in detail, the present invention is not limited to the above-mentioned embodiments, and other embodiments, variations and modifications may be made without departing from the scope of the present invention.

DESCRIPTION OF LETTERS OR NUMERALS

1 Engine system
22 Surge tank
30 Fuel injection valve
31 Nozzle body
31 Seat position
31b Inner peripheral wall
32 Jet hole
33 Needle
33a Seat part
33b Inner peripheral wall
34 Fuel path
35 First eccentricity suppression portion
36 Rotational flow generation portion
36a, 36b Spiral groove
37 Air introduction path
38 Opening
39 Check valve
40 Spring
41 Second eccentricity suppression portion
42 Groove
100 Engine

The invention claimed is:

1. A fuel injection valve comprising:
a nozzle body provided with a jet hole at an end portion of the nozzle body;
a needle slidably arranged within the nozzle body, defining a fuel introduction path between the needle and the nozzle body, and provided with a seat portion seated on a seated position within the nozzle body, and provided with a first eccentricity suppression portion in a front end side of the needle;
a rotational flow generation portion formed in an upstream side of the seat portion of the needle, and provided with a spiral groove giving a rotational component to a fuel introduced from the fuel introduction path;
an air introduction path formed inside the needle; and
a rotation stable chamber formed at the end portion of the nozzle body, the fuel that has passed through the rotational flow generation portion and the air that has passed through the air introduction path being introduced into the rotational stable chamber,
wherein a diameter De of the rotation stable chamber satisfies the following equation:

$$De \leq Q \times \cos\theta \times Rs^2 \times Rd/(2200 \times \pi \times Sg)$$

wherein
Q is a greatest flow rate,
θ is a spiral grove angle with respect to the horizontal direction at a terminal end of the spiral groove,
Rs is a spiral groove area ratio, the spiral groove area ratio $Rs=Sg/(CL+Sg)$,
Rd is a rotation diameter ratio, the rotation diameter ratio $Rd=Di/De$,
Di is a fuel introduction path diameter,
Sg is the spiral groove area, and
CL is an area defined between an outer circumferential wall surface of the first eccentricity suppression portion and an inner circumferential wall surface of the nozzle body, a total of the clearance CL and the spiral groove area Sg is a flow path area through which the fuel can flow from the fuel introduction path into the rotation stable chamber.

2. The fuel injection valve of claim 1, wherein a spiral pitch of the spiral groove is narrower as closer to the seat portion.

3. The fuel injection valve of claim 1, wherein an opening of the air introduction path faces a central portion of the rotation stable chamber.

4. The fuel injection valve of claim 1, wherein an axis of the air introduction path is identical to an central axis of the rotation stable chamber, and a diameter of the opening of the air introduction path is equal to or less than one thirds a diameter of the rotation stable chamber.

5. The fuel injection valve of claim 1, wherein the jet hole is provided at a position offset from a central axis of the rotation stable chamber.

6. The fuel injection valve of claim 1, wherein the jet hole is offset from an central axis of the rotation stable chamber by equal to or more than a quarter of a diameter of the rotation stable chamber.

7. The fuel injection valve of claim 1, wherein the air introduction path is provided with a check valve opening the air introduction path when the rotation stable chamber is in a negative pressure state.

* * * * *